United States Patent
Carroll, II

[11] Patent Number: 5,547,589
[45] Date of Patent: Aug. 20, 1996

[54] WATER RECOVERY FROM A SEPTIC TANK

[76] Inventor: Paul L. Carroll, II, 2548 SE. Monroe St., Stuart, Fla. 34997

[21] Appl. No.: 456,989

[22] Filed: Jun. 1, 1995

[51] Int. Cl.$^6$ .............................. C02F 1/50; B01D 24/12
[52] U.S. Cl. .......................... 210/747; 210/764; 210/170;
        210/265; 210/283; 210/284; 210/266; 210/532.2;
        405/128; 166/305.1
[58] Field of Search .................. 210/265, 532.2,
        210/284, 283, 266, 747, 170, 764; 405/128;
        166/305.1

[56] References Cited

U.S. PATENT DOCUMENTS

| | | | |
|---|---|---|---|
| 2,348,161 | 5/1944 | Duzee | 166/305.1 |
| 2,551,434 | 5/1951 | Gray et al. | 166/305.1 |
| 3,029,950 | 4/1962 | Frasca | 210/284 |
| 3,333,638 | 8/1967 | Bishop | 166/305.1 |
| 3,538,340 | 11/1970 | Lang | 166/305.1 |
| 3,784,012 | 1/1974 | Carlson | 210/170 |
| 3,817,864 | 6/1974 | Carlson et al. | 210/170 |
| 4,162,976 | 7/1979 | Monson | 210/170 |
| 4,429,740 | 2/1984 | Malinchak | 166/305.1 |
| 4,865,069 | 9/1989 | Lacey | 210/170 |
| 5,032,042 | 7/1991 | Schuring et al. | 405/128 |
| 5,314,265 | 5/1991 | Perkins et al. | 405/128 |
| 5,345,655 | 9/1994 | Berhardt | 210/170 |

Primary Examiner—Cynthia L. Nessler

[57] ABSTRACT

Effluent is pumped into a first multistage, modular, vertical filter that extends from ground level to depth near or at the water table. A fluid accumulator, located at the bottom of the filter, accumulates water from the filter stages. The water in the accumulator is pumped into the surrounding soil by pressurizing it from a ground level pump. Fluid that accumulates around the filter is removed for irrigation. The filter and accumulator are removed as a single unit from well shaft for servicing.

17 Claims, 3 Drawing Sheets

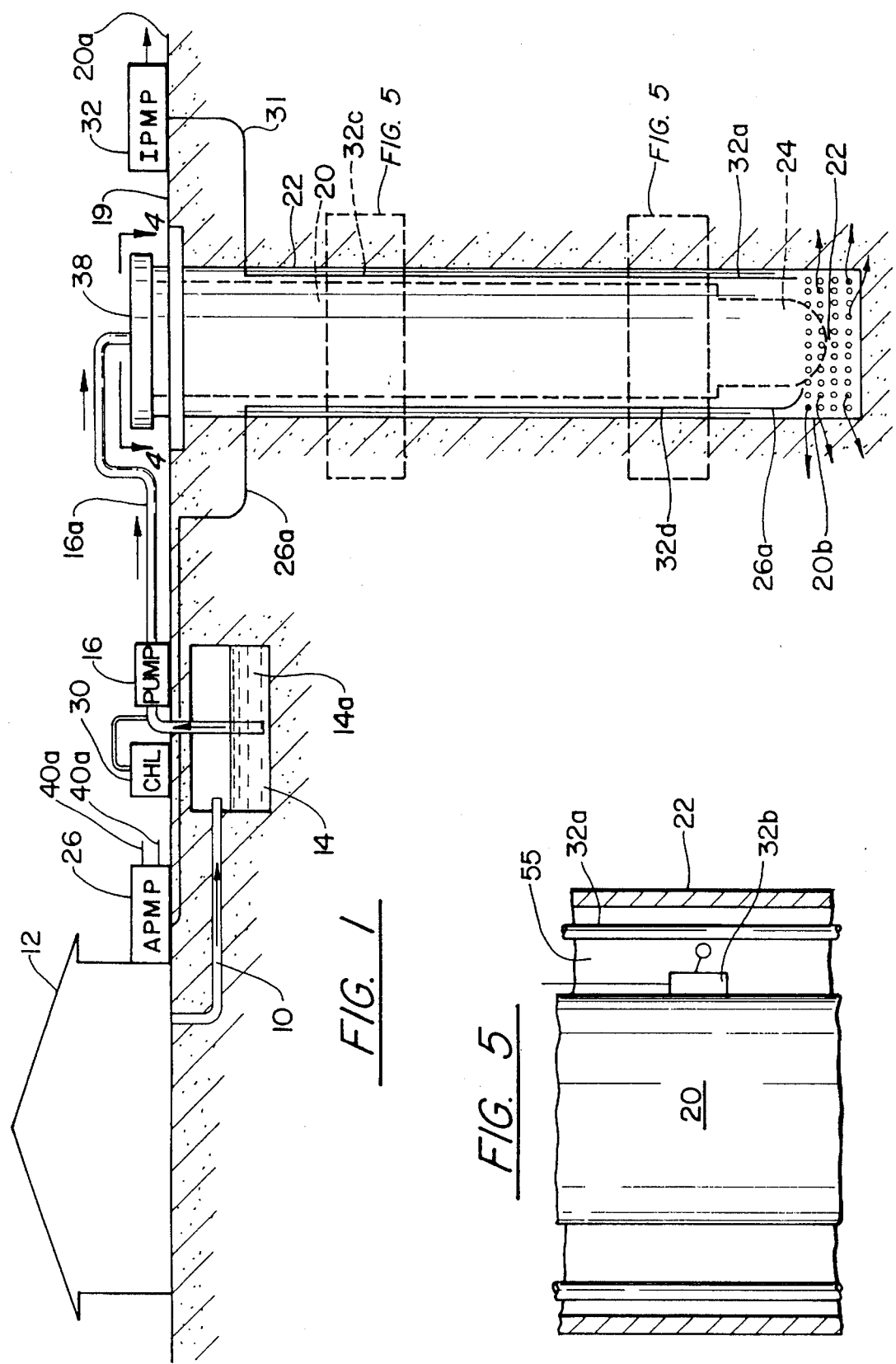

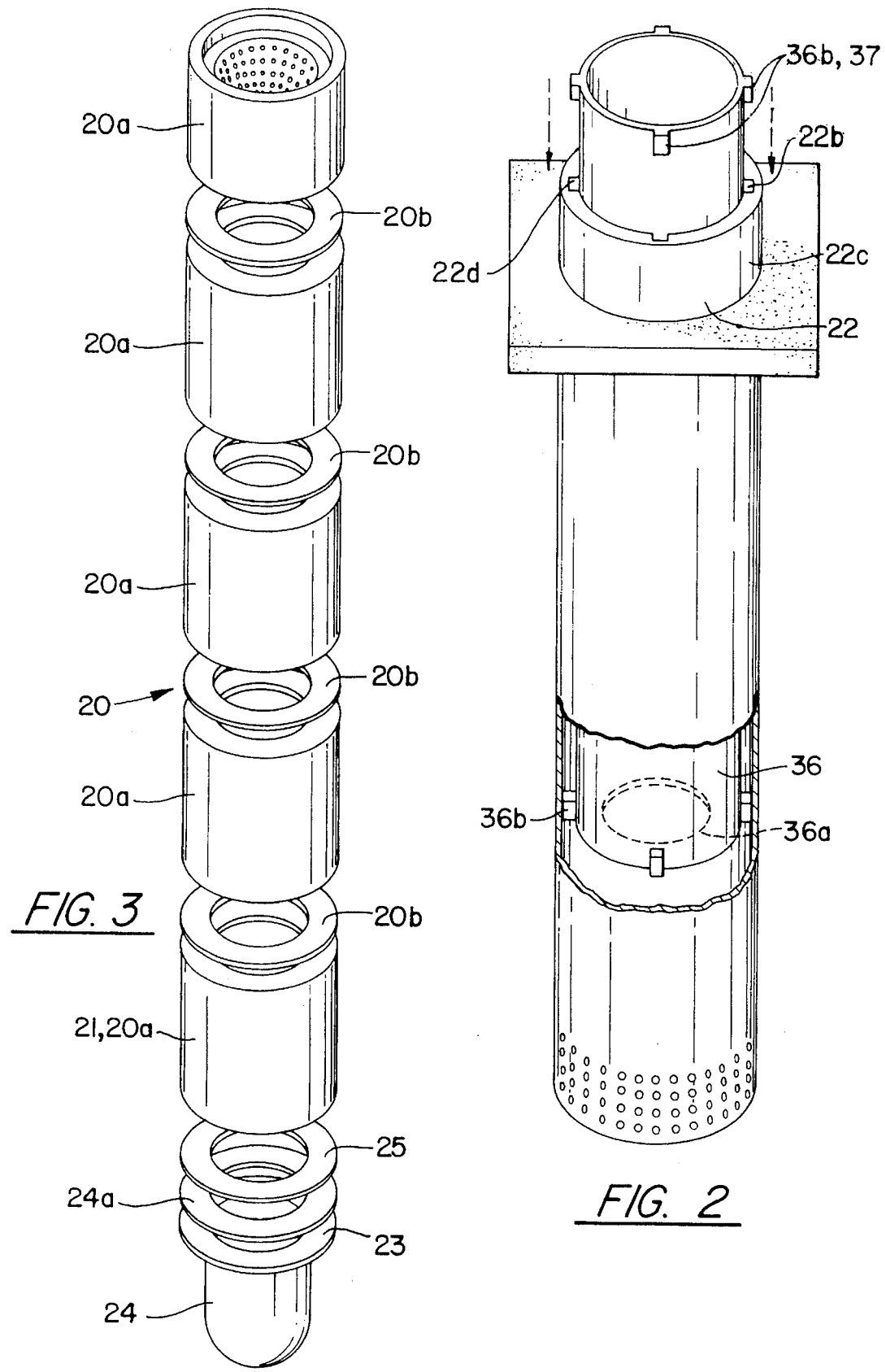

5,547,589

WATER RECOVERY FROM A SEPTIC TANK

FIELD OF THE INVENTION

This invention relates to sanitation systems using a septic tank.

BACKGROUND OF THE INVENTION

In conventional sanitation systems using a septic tank, waste water empties into the septic tank, solids accumulate and decompose on the bottom of the tank and an effluent exits the top of the tank into a "drain field." The drain field, located a few feet below ground level, is intended to disperse the effluent into the soil, where it is filtered. The typical drain field comprises downward oriented conduits with holes at the bottom facing a stone bed, the stone providing a flow path to the surrounding soil from the holes and preventing the soil from filing the holes.

But drain fields can become contaminated over time. Even new drain fields can exhibit the problems of contaminated fields if the water table is too high or the soil is too compacted or otherwise has poor filtering qualities. The basic problem when a drain field is contaminated is that the effluent is not absorbed and backs up to the septic tank. The field is effectively clogged, and that can happen for many reasons: soil compaction; a high water table; bacterial growth in the soil; improper drain inclination; and pipe clogging. When a drain field is clogged, the repair is complicated and expensive. The entire field must be dug up, causing considerable land damage. But repair assumes that there is adequate land to install a new drain field. Smaller plots can make it extremely difficult to lay out drain fields with the separation mandated by local ordinances. Topographical changes can make it impossible to install an effective new drain field. It is common to find that septic systems are used only where building plots are relatively large. The alternative, sewer systems, are expensive to install, and, generally speaking, do not recover water in the effluent.

A typical home can consume a considerable amount of water each day, all of it ultimately entering the drain field where, ideally, it eventually enters the water table, far below, filtered by the soil in the process. In reality, that filtration process's efficiency is limited by soil characteristics and the height of the water table. Also, some water evaporates, especially in hot climates.

SUMMARY OF THE INVENTION

An object of the present invention is to provide a superior septic sanitation system.

According to the invention, effluent from a septic tank is filtered and supplied to an underground accumulator tank or reservoir. The fluid accumulated in the tank is forced into the surrounding soil.

According to the invention, the effluent is applied to a modular, removable, vertical filtration system that extends from the surface to the water table. The effluent flows down the filter, being cleansed in the process, and accumulates at the bottom in an accumulator from which the water is forced out into the water table by pressurizing the accumulator, for instance, with compressed air from a surface pump.

According to the invention a bactericide, such as chlorine, is injected into the water, for instance, at the top of the filter.

According the invention, a shaft is dug from the surface to the vicinity of the water table and a well conduit is inserted. The conduit contains holes or perforations at the bottom. The filter is then inserted section by section into a filter conduit inserted and suspended in the well conduit. A space between the walls of the conduits allows water from the filter accumulate. When the water reaches a certain height in the conduit, it is pumped out for household use, such as lawn sprinkling.

According to the invention, the filter has filtering stages consisting of different filtering materials. The filter conduit can be extracted from the conduit for servicing the filter stages and the accumulator.

A benefit to the invention is that it provides effluent filtration and injection into the water table very efficiently, eliminating the concerns for proper spacing and lot size associated with tradition drain fields. Another benefit is that the treated water can be reused. Another benefit is that the filter can be easily serviced. A feature of the invention is that the filter elements and filter materials can be selected to remove particular chemicals in the effluent.

Other objects, benefits and features of the invention will be apparent to one of ordinary skill in the art from the following discussion.

BRIEF DESCRIPTION OF THE DRAWING

FIG. 1 is a cross-section of a sanitation system embodying the present invention.

FIG. 2 is a perspective of a filter embodying the present invention.

FIG. 3 is an exploded view of the filter shown in FIG. 2.

FIG. 5 is an enlarged cutaway view of a portion of the filter shown in FIG. 1.

DESCRIPTION OF THE PREFERRED EMBODIMENTS

Figure 4:
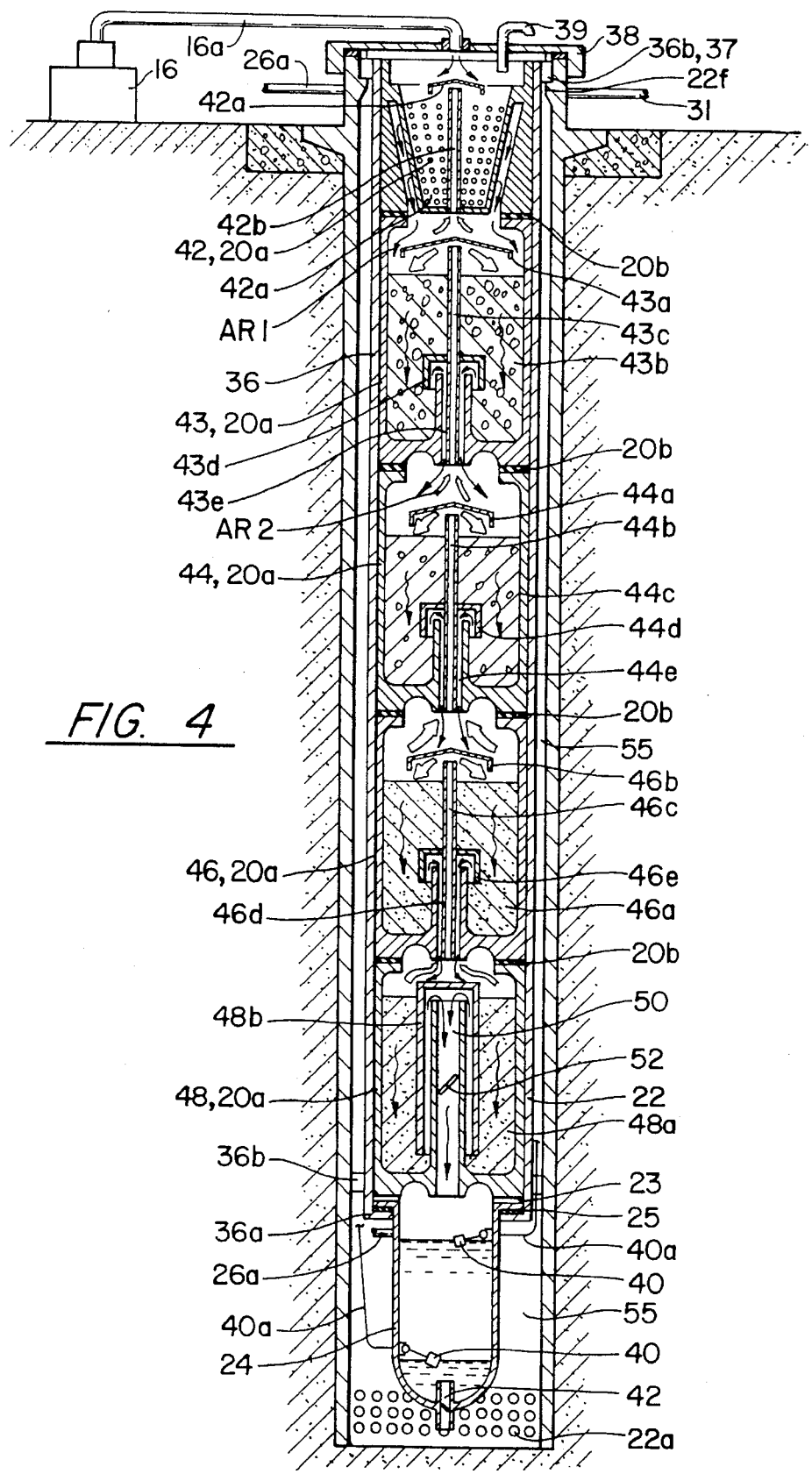
FIG. 4 is a cross-section taken along line 4—4 in FIG. 1.

Referring to FIG. 1, a sanitary line 10 leads from a home 12 to a septic tank 14. A water pump 16 draws effluent 14a from the septic tank 14 applying it through a line 16a to the upper end of a modular, vertical multistage filter 20. As explained below, this filter 20 extends from ground level 20a to a lower location 20b in the vicinity of the water table. The filter 20 is contained in a well conduit 22 that has solid, water tight walls excerpt for perforations or holes 22a at is lowest end, in the vicinity of level 20b. The effluent flows vertically down the filter 20, passing through different filter stages, finally entering an accumulator 24, also in the vicinity of level 20b. An air pump (APMP) 26, at ground level, is connected over a supply line 26a to the accumulator 24. It will be explained below, that fluid level sensors are provided in the accumulator 24 to activate the air pump when the water level in the accumulator reaches a trigger level. The pump then turns on pressurizing the accumulator, forcing the water from the bottom of the accumulator into the surrounding soil through the perforations 22a. A chlorinator 30, it will be noticed, injects chlorine or a similar bactericide into the effluent, complimenting the filtration process. Water may accumulate between the conduit 22 and the filter 20. A recycling pump 32, also at ground level, draws this water from a line 32a. Float switches 32a (see FIG. 5) are located at levels 32c and 32d to activate a resettable latch switch (not shown) at the pump, so that when the water level exceeds level 32c the pump discharges the water at 32e and remains on until the level is below 32d. The water may be used for lawn irrigation.

Referring to FIGS. 2 and 3, it can be seen that the filter 20 contains filter cartridges 20a separated by o-ring seals 20b with the accumulator 24 at bottom. The filter cartridges are stacked on top of each other in a filter conduit 36 which contains an inwardly-radially directed filter support flange 36a at the bottom. The accumulator 24, it will be seen, contains an outwardly radially extending flange 24a that rests on the flange. An o-ring 23 is located between the two flanges. Another o-ring 25 seals the connection between the flange 24 and the lowest filter cartridge 21. It will be seen that the conduit contains spacers 36b; these guide the filter through the conduit and establish a space for water accumulation between the two conduits. The filter conduit 36 hangs from the top of the well conduit 22. One way to achieve that is to construct the top 22c with a lip 22f (see FIG. 4) to capture the spacers 36. To insert the filter, the spacers are inserted through the slots 22d in the lip 37 at the top of the conduit. When the filter is completely inserted, it is rotated slightly to that it can hang from the upper spacers 37, which have the effect of an upper filter flange.

Referring to FIG. 4, which provides a more detailed view with the filters 20a installed, the arrows AR1 identify effluent flow and arrows AR2 identify venting air flow toward the top of the filter. It will noticed that there are two fluid level switches 40 in the accumulator 24. These define the on/off limits for the air pump 26 to which they are connected by the conductors 40a. A discharge check valve 42 is located at the bottom of the accumulator. This valve is normally closed but opens when the pressure in the accumulator reaches a specific level when the air pump operates. The upper switch 40 signals the air pump 26 to operate. Then the water is pumped out through the check 42 until the lower switch 40 is activated, turning off the air pump 26. The water exits near the perforations or drain holes 22a, easily entering the surrounding soil and water table.

The effluent is pumped in through a removable cover 38, provided with a vent 39. The upper spacers 37 rest on the lip 22f formed by a small ID portion of the well conduit 22. The effluent enters at the top filter stage 42, which comprises a basket filter that permits fluid to drip from its sides as shown by the small arrows. A baffle plate 42a deflects the effluent from a vent tube 42b into the basket area. This tube 42b provides a vent path through the filter stage. The partially filtered effluent from the top filter 42 enters a next filter stage 43, where a baffle plate 43a directs it to charcoal filter material 43b, away from another vent tube 43c. An internal baffle or deflector 43d prevents effluent from directly entering a concentric overflow passage or tube 43c around the vent tube 43c. When the effluent level in the charcoal filter 43b reaches the top of the overflow tube 43d, it flows down into the next filter stage 44. There, the effluent strikes another baffle 44a or deflector shielding a vent tube 44b. Filter 44 contains limestone 44c and like filter 43 contains an internal baffle 44d so that effluent leaves this stage only when it rises to the level of the top (inlet) of an overflow tube 44e, also concentric with a vent tube 44b. The next stage 46 contains magnetic sand 46a. The effluent from the upper filter stages is deflected by a baffle 46b from a vent tube 46c. An internal baffle 46c prevents the effluent from directly entering the overflow tube 46d surrounding the vent tube 46c. When the effluent reaches the top of the overflow tube 46d in flows down to the next stage 48. Here, any unfiltered solids 48a in the already highly filtered effluent settle. A baffle 48b extends nearly to the bottom of this stage. As the fluid level rises in the filter 48, it will spill over into the fluid input line 50 to the accumulator 24, passing through a check valve 52, which closes when the accumulator 24 is pressurized. The fluid in the accumulator is highly filtered, chemically treated water, ready for injection into the surrounding area. That is accomplished by pressurizing the accumulator, as explained above. Since it is possible that the water will rise in the space 55 and up the in the space between the filter conduit and the well conduit, the mentioned switches 32b (FIGS. 1 and 5) will be activated removing the water for domestic use, such as lawn sprinkling.

It can be easily appreciated that the filter can be easily serviced by extracting the filter conduit 36. Then the individual filter elements can be serviced. While certain filtering materials have been shown, other materials may be more useful for certain application. It can be appreciated that the filter materials can be selected to remove site-specific chemicals in the effluent, thus customizing the system to the application. Other ways to suspend the filter conduit in the well conduit may be possible, of course. In the above embodiment, the bactericide is injected at the surface into the effluent. It is also possible, however, to inject it into the accumulator tank directly from the surface in liquid or gas form as function of the accumulator fluid level and synchronized with the accumulator discharge cycle to so that the water in the accumulator receives adequate chemical treatment. This conceivably could be done by using the compressed air line 26a.

With the benefit of the previous discussion of the invention, one of ordinary skill in the an may be able to modify the invention in whole or in part without departing from the true scope and spirit of the invention.

I claim:

1. A method, comprising:

injecting an effluent into a top of an elongated filter that extends to a depth below ground level;

capturing filtered fluid exiting said filter in an accumulator at said depth;

pressurizing the accumulator to discharge the fluid into the ground area surrounding the accumulator.

2. A method as described in claim 1, comprising:

injecting a bactericide into the effluent.

3. A method as described in claim 2, comprising:

sensing the level of fluid around said elongated filter; and pumping said fluid to ground level when said level reaches a particular height.

4. A sanitation system filter, comprising:

a conduit;

a fluid accumulator at one end of said conduit;

a plurality of gravity filters stacked on top of each other to create a fluid path between said accumulator and a second end of said conduit;

a check valve between said accumulator and said filters to prevent reverse flow from said accumulator;

a pressure release valve at the bottom of said accumulator; and pump means connected to said accumulator for providing a pressurizing medium to said accumulator.

5. A filter for insertion into a conduit extending from ground level to a lower location, comprising:

a tubular container;

a plurality of canister filters removable from said container; and a fluid accumulator at the bottom of said container to receive filtered fluid from said plurality of canister filters;

said plurality of canister filters being stacked above said fluid accumulator; and said fluid accumulator having means for preventing reverse flow to said plurality of canister filters and means for discharging fluid in said fluid accumulator in response to pump pressure applied to said fluid accumulator.

6. A sanitation system, comprising:

a septic tank;

a first conduit extending vertically from ground level to a first depth;

a filter removably inserted in said first conduit, said filter having a water accumulator at said first depth, a filter inlet vertically above said first depth, and means for draining water from said accumulator into said first conduit when the pressure in said accumulator reaches a first pressure;

means for supplying effluent from said septic tank to said filter inlet; and pump means for pressurizing said accumulator to said first pressure and for discharging said water into said first conduit.

7. A sanitation system according to claim 6, comprising:

means for drawing to ground level fluid discharged from said accumulator.

8. A sanitation system according to claim 6, wherein:

said first conduit comprises drain perforations adjacent said accumulator.

9. A sanitation system according to claim 6, wherein:

said pump means for pressurizing comprises an air pump, an air supply line connecting said air pump to said accumulator, and fluid level sensing means for providing a control signal to activate said air pump in response the fluid level in said accumulator.

10. A sanitation system according to claim 6, comprising:

means for injecting a purification material into the effluent.

11. A sanitation system according to claim 6, wherein:

said filter comprises a second conduit having said accumulator at one end, the diameter of said second conduit being less than the diameter of the first conduit to create a chamber between the first conduit and the second conduit; and means for removing water from said chamber.

12. A sanitation system according to claim 11, wherein:

said second conduit contains a plurality of spacers that engage an inner wall of the first conduit and a second plurality of spacers from which said second conduit is suspended in said first conduit.

13. A sanitation system according to claim 11, wherein:

said accumulator contains a radially outwardly extending flange; and said second conduit contains a radially inwardly extending flange below said outwardly extending flange to support said accumulator.

14. A sanitation system according to claim 11 wherein:

said pump means for pressurizing comprises an air pump at ground level, an air supply line connecting said air pump to said accumulator and fluid level sensing means for providing a control signal to activate said air pump in response to the fluid level in said accumulator; and said means for removing water comprises a water pump at ground level, a fluid line extending from said pump to said chamber and means for activating said water pump in response to fluid level in said chamber.

15. A sanitation system according to claim 14, wherein:

said filter comprises filter cartridges stacked in said second conduit.

16. A sanitation system according to claim 15, comprising:

a vertical air vent extending from top to bottom in the center of one of said filter cartridges and a baffle over said vent;

a filter material around said vent; and means for draining fluid from said filter material to a lower filter stage.

17. A sanitation system according to claim 16, wherein:

said means for draining comprises an overflow tube extending from the bottom to an intermediate height of said material and a baffle above said overflow tube and within said material.

* * * * *